United States Patent
Gao et al.

(10) Patent No.: US 11,607,980 B2
(45) Date of Patent: Mar. 21, 2023

(54) SEAT ASSEMBLY WITH DEPLOYABLE PANEL

(71) Applicant: Ford Global Technologies, LLC, Dearborn, MI (US)

(72) Inventors: Zhenyan Gao, Northville, MI (US); Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 17/172,414

(22) Filed: Feb. 10, 2021

(65) Prior Publication Data
US 2022/0250518 A1    Aug. 11, 2022

(51) Int. Cl.
*B60N 2/68* (2006.01)
*B60N 2/14* (2006.01)
*B60N 2/427* (2006.01)

(52) U.S. Cl.
CPC ............ *B60N 2/686* (2013.01); *B60N 2/143* (2013.01); *B60N 2/42727* (2013.01)

(58) Field of Classification Search
CPC ..... B60N 2/686; B60N 2/143; B60N 2/42727
USPC ........................................ 297/216.13, 216.14
See application file for complete search history.

(56) References Cited

U.S. PATENT DOCUMENTS

| | | | |
|---|---|---|---|
| 3,889,970 A | | 6/1975 | Astheimer et al. |
| 4,468,051 A | * | 8/1984 | Kobayashi ............ B60N 2/143 280/751 |
| 5,641,198 A | * | 6/1997 | Steffens, Jr. ......... B60N 2/4249 297/483 |
| 8,997,660 B2 | * | 4/2015 | Satterfield ............ A47B 13/081 108/73 |
| 9,623,826 B2 | * | 4/2017 | Weng .................... B60R 21/207 |
| 9,981,622 B2 | * | 5/2018 | Ohmura ................ G01C 21/34 |
| 10,035,484 B2 | * | 7/2018 | Jaradi ................... B60R 21/207 |
| 10,752,199 B2 | | 8/2020 | Chen et al. |
| 2006/0214479 A1 | * | 9/2006 | Dwire ................... B60N 3/004 297/163 |
| 2020/0079254 A1 | * | 3/2020 | Mori ..................... B60R 21/045 |
| 2020/0122676 A1 | * | 4/2020 | Sekizuka ............ B60N 2/4228 |
| 2020/0353885 A1 | * | 11/2020 | Kim .................. B60R 21/01554 |
| 2021/0370811 A1 | * | 12/2021 | Jaradi ..................... B60N 2/64 |

FOREIGN PATENT DOCUMENTS

JP             4701796 B2    3/2011

* cited by examiner

*Primary Examiner* — David R Dunn
*Assistant Examiner* — Tania Abraham
(74) *Attorney, Agent, or Firm* — Frank A. MacKenzie; Bejin Bieneman PLC (57) ABSTRACT

A seat assembly for a vehicle includes a seatback having a seat frame. The seat assembly includes a panel having an end slidably supported by the seat frame. The panel is bowable outwardly from the seat frame to a deployed position. The seat assembly includes an actuator supported by the seat frame and connected to the end of the panel.

19 Claims, 7 Drawing Sheets

SEAT ASSEMBLY WITH DEPLOYABLE PANEL

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

A vehicle includes a dash, a seat having a seatback, a panel having an end slidably supported by the seatback, the panel being bowable outwardly from the seatback and toward the dash to a deployed position, and an actuator supported by the seatback and connected to the end of the panel.

The panel may be designed to abut the dash when the panel is in the deployed position.

The panel may include a second end spaced from the end, the second end fixed to the seatback.

The panel may include a first segment and a second segment hinged to the first segment, the second segment including the end slidably supported by the seatback.

The panel may include a third segment hinged to the first segment, the third segment including a second end fixed to the seatback.

The seatback may include a track, the end of the panel being slidably engaged with the track.

The actuator may include a lock maintaining the panel in the deployed position.

The seat may be movable from a forward-facing position to a rearward-facing position, the seatback defining an occupant seating area of the seat and the panel being between the dash and the occupant seating area when the seat is in the rearward-facing position.

The seat may be movable from a forward-facing position to a rearward-facing position, the panel being designed to abut the dash when the seat is in the rearward-facing position and the panel is in the deployed position.

The vehicle may include a computer including a processor and a memory storing instructions executable by the processor, wherein the instructions include identifying that the seat is in a rearward-facing position and moving the panel to the deployed position based on identification that the seat is in the rearward-facing position.

A seat assembly includes a seatback including a seat frame, a panel having an end slidably supported by the seat frame, the panel being bowable outwardly from the seat frame to a deployed position, and an actuator supported by the seat frame and connected to the end of the panel.

The panel may include a first segment and a second segment hinged to the first segment, the second segment including the end slidably supported by the seatback.

The panel may include a third segment hinged to the first segment, the third segment including a second end fixed to the seat frame.

The seatback may include a track, the end of the panel being slidably engaged with the track.

The actuator may include a lock maintaining the panel in the deployed position.

The panel may include a first rod fixed to the seat frame and a second rod at the end, the second rod being slideably supported by the seat frame.

The seat assembly may include a cable extending from the actuator to the first rod and from the first rod to the second rod.

The seat assembly may include a cable extending from the actuator to the end of the panel.

The seatback may define an occupant seating area, the seatback being between the panel and the occupant seating area.

The panel may be designed to abut a dash of a vehicle when the panel is in the deployed position.

With reference to the Figures, wherein like numerals indicate like parts throughout the several views, a seat assembly 10 for a vehicle 12 includes a seatback 14 having a seat frame 16. The seat assembly 10 includes a panel 18 having an end 20 slidably supported by the seat frame 16. The panel 18 is bowable outwardly from the seat frame 16 to a deployed position. The seat assembly 10 includes an actuator 22 supported by the seat frame 16 and connected to the end 20 of the panel 18.

In the event of an impact to the vehicle 12 and when the seat assembly 10 is in a rearward-facing position, the panel 18 may move to the deployed position. The actuator 22 slides the end 20 of the panel 18 relative to the seat frame 16 and moves the panel 18 to the deployed position. The panel 18 is bowable outwardly from the seat frame 16 to support the seatback 14 in the event of an impact to the vehicle 12, e.g., against a dash 24 in the vehicle 12. The panel 18 may contact the dash 24 and limit the rotation of the seatback 14 toward the dash 24 in the event of an impact to the vehicle 12. The panel 18 may absorb energy during the impact by increasing the contact area between the dash 24 and the seatback 14.

Figure 1:
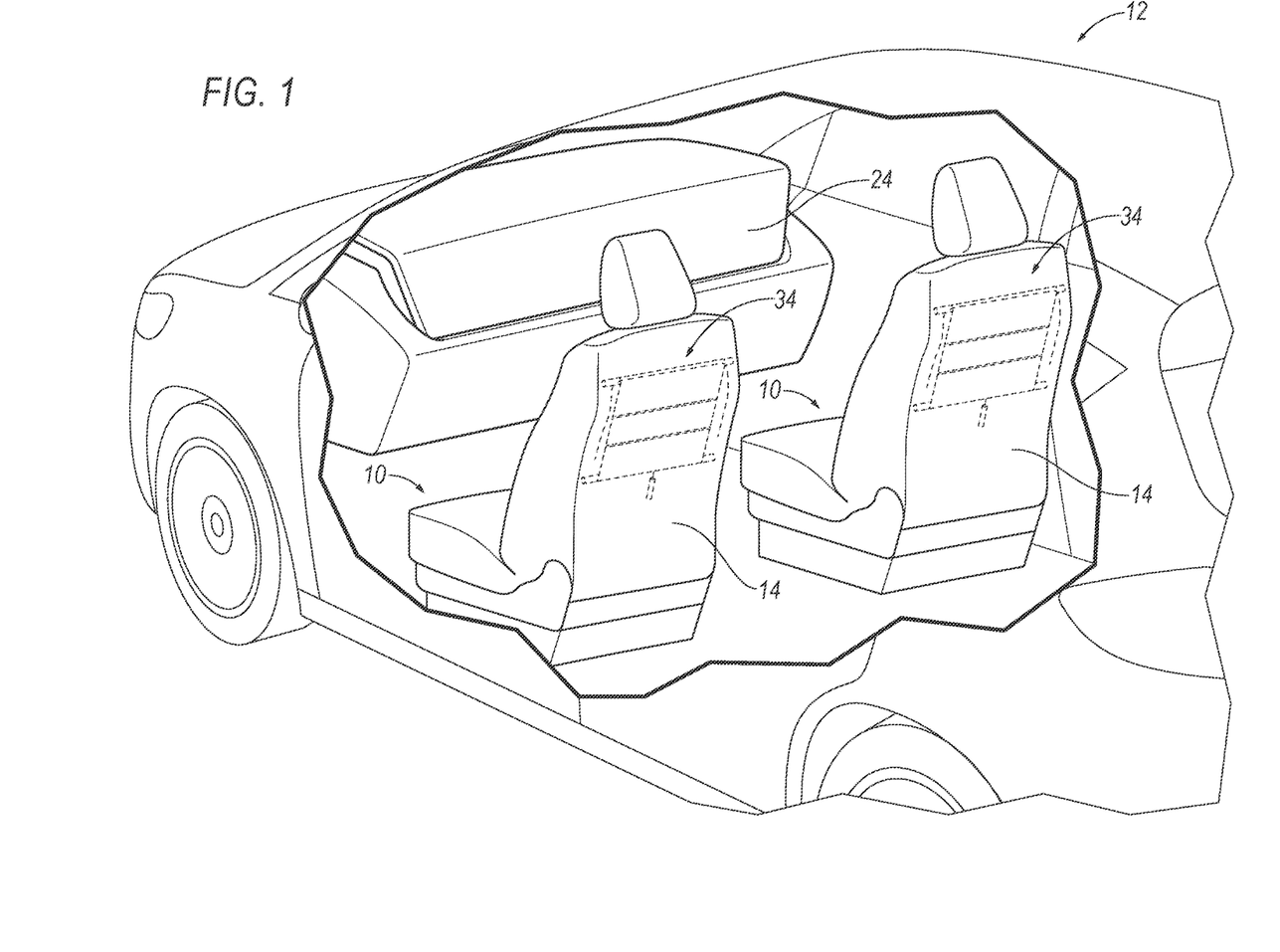
FIG. 1 is a perspective view of a vehicle having a pair of seat assemblies including panels in a undeployed position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 includes at least one dash 24. In the example shown in the Figures, the vehicle 12 includes one dash 24 at the front end of the passenger compartment. In addition or in the alternative, the vehicle 12 may include another dash 24 at the rear end of the passenger compartment. The dash 24 may also be called a bulkhead or an instrument panel.

The dash 24 may be a structural member of a frame of the vehicle 12, i.e., a portion of the frame resists static and dynamic forces from operation of the vehicle 12 without undue deflection or distortion. Examples of forces include a weight of other vehicle 12 components, passengers, and cargo; twisting forces caused by driving over uneven surfaces; torque from a transmission; longitudinal and lateral forces from driving; and possibly forces from impacts with other vehicles or impactors.

The dash 24 may include vehicle controls, such as gauges, dials, screens, and information displays; heating and ventilation equipment; a radio and other electronics; etc. The dash 24, as well as the rest of the vehicle 12, may lack a steering wheel and may lack pedals for accelerating and braking. In other words, as shown in the Figures, no steering wheel or pedals for accelerating and braking are supported by or adjacent to the dash 24. More specifically, the vehicle 12 does not include a steering wheel or pedals for accelerating and braking, e.g., the vehicle 12 is autonomous.

The dash 24 may extend from one side of the vehicle 12 to the other side of the vehicle 12, i.e., across the passenger compartment in a cross-vehicle direction. For example, the dash 24 may extend from one body pillar to another body pillar. The dash 24 may extend downwardly from a windshield. For example, the dash 24 may extend from the windshield to a floor of the vehicle 12.

The dash 24 may be in front of the seat assemblies 10, e.g., at the front end of the passenger compartment, as shown in Figure. In such an example, the dash 24 faces the seat assemblies 10. The dash 24 may, for example, include a class-A surface, i.e., a surface specifically manufactured to have a high quality, finished aesthetic appearance free from blemishes.

Figure 2:
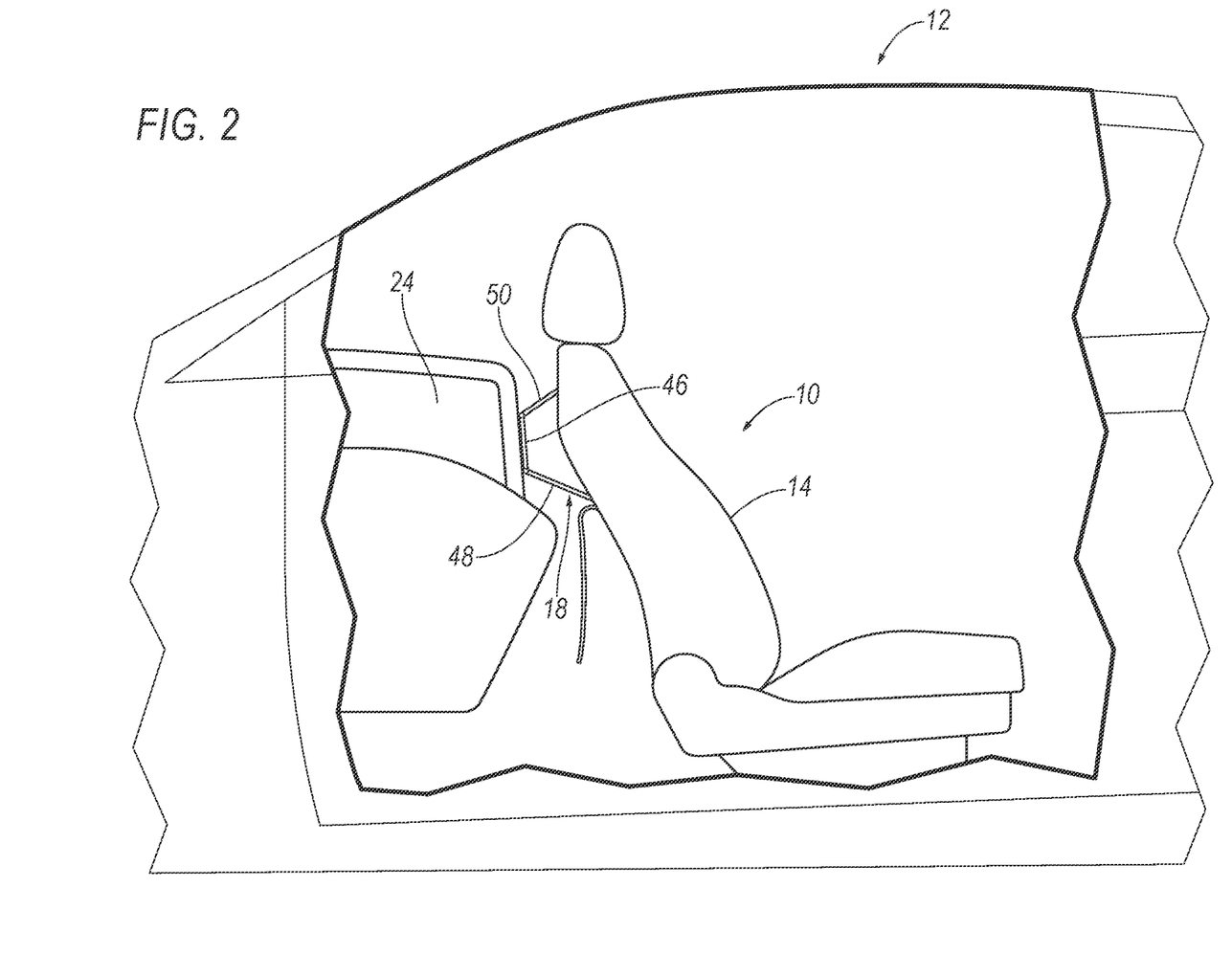
FIG. 2 is a side view of the vehicle having a seat assembly in a rearward-facing position with the panel in the deployed position and abutting a dash of the vehicle.
Figure 3A:
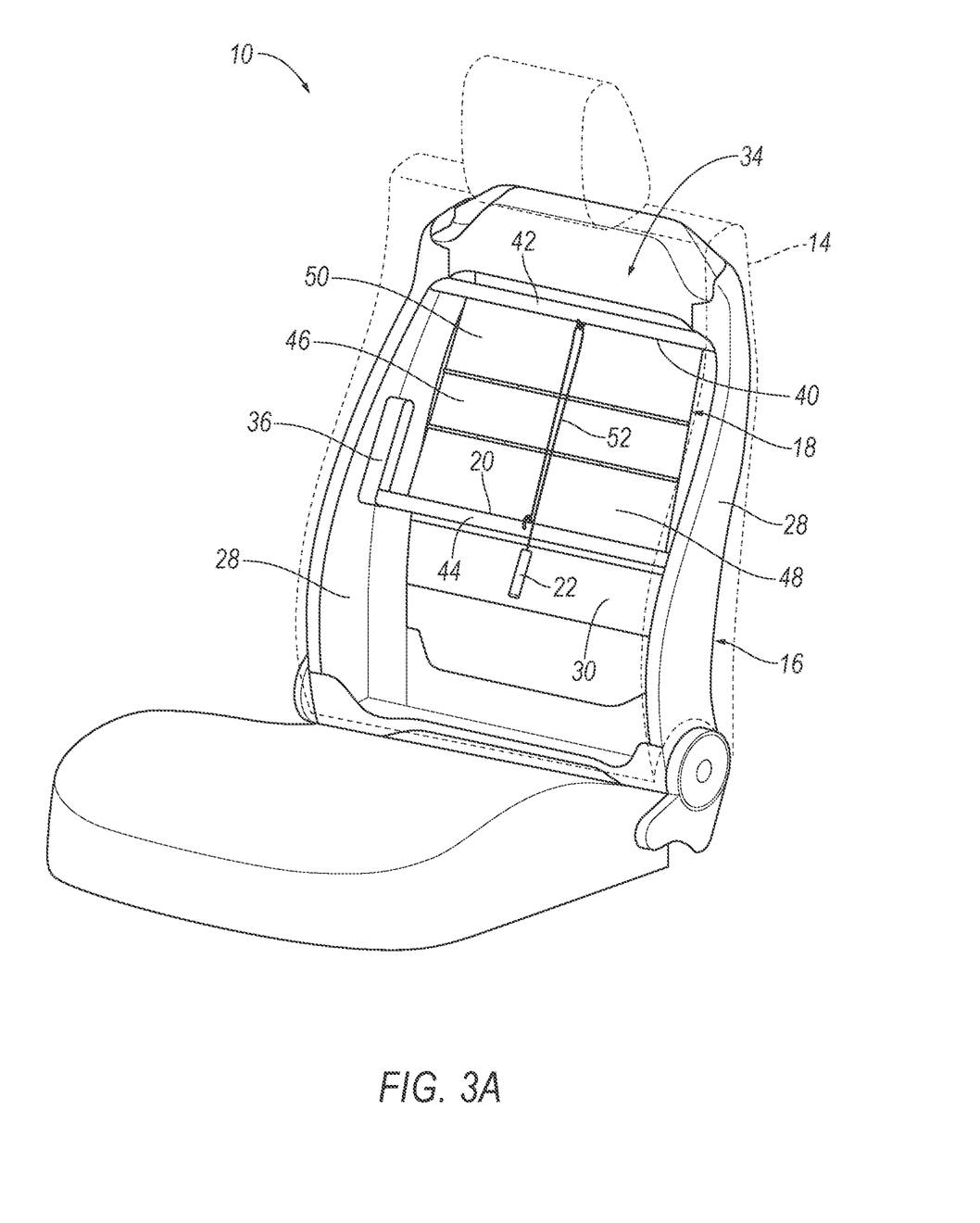
FIG. 3A is a forward perspective view of the seat assembly with the panel in the undeployed position.
Figure 3B:
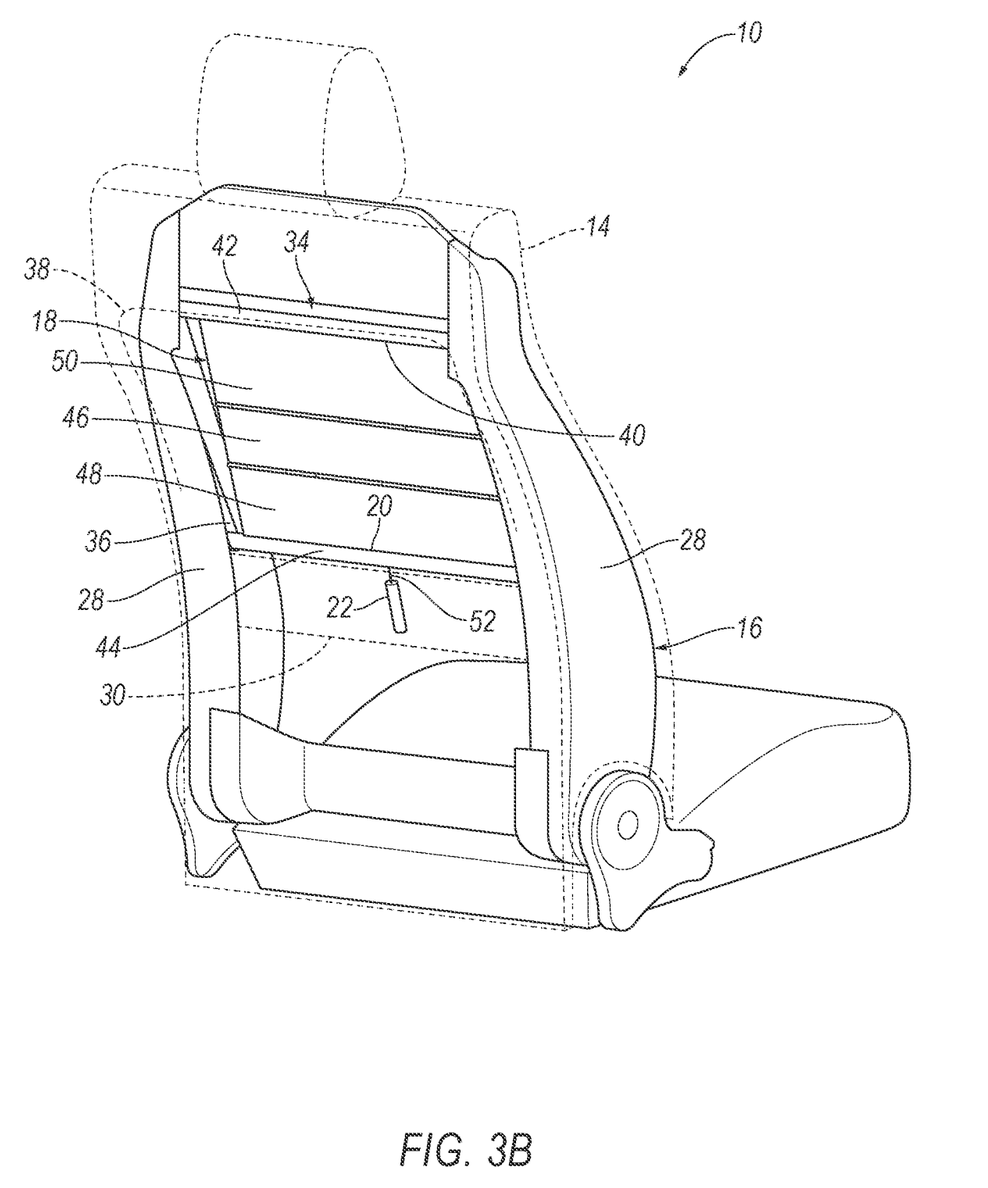
FIG. 3B is a rearward perspective view of the seat assembly with the panel in the undeployed position.
Figure 4A:
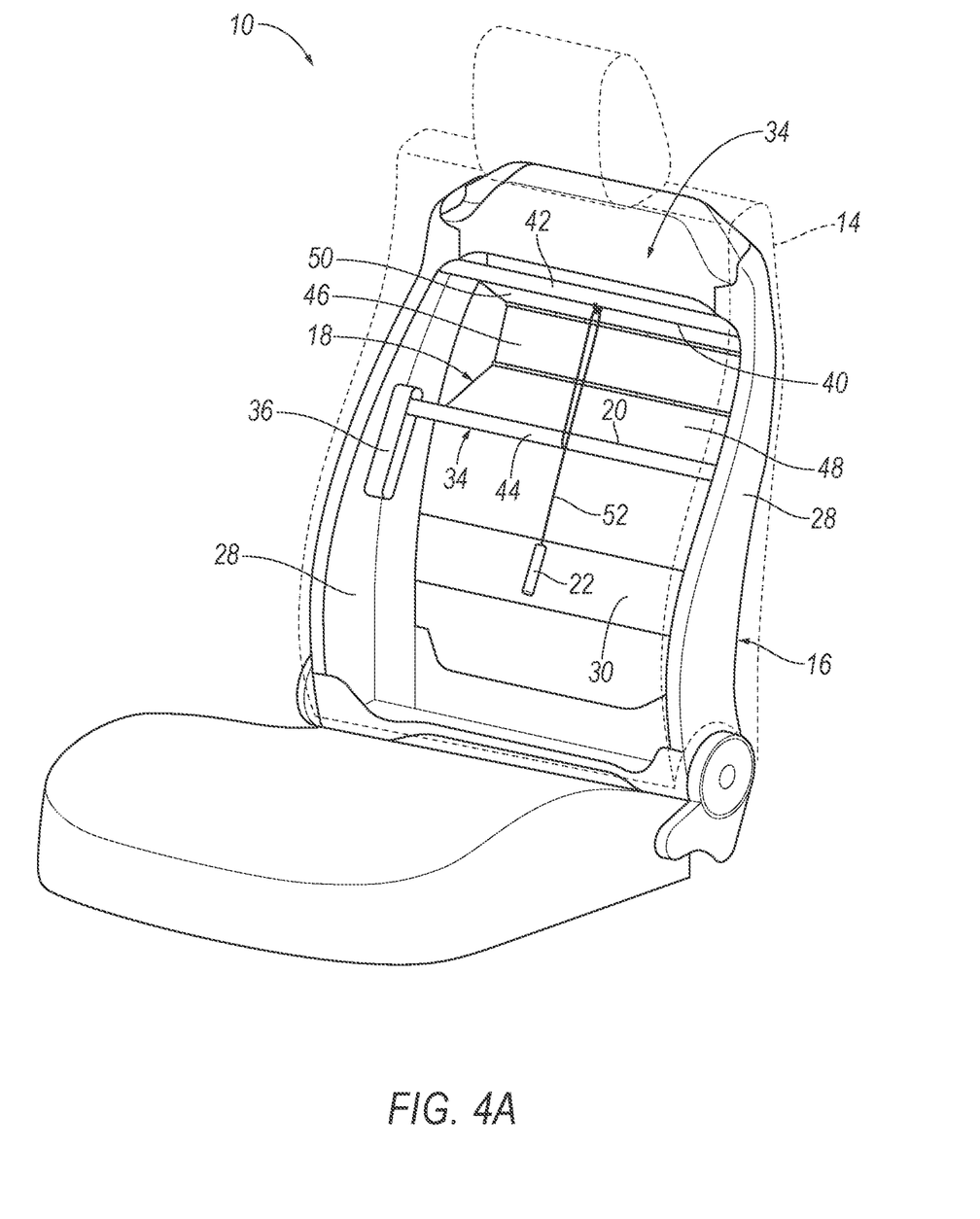
FIG. 4A is a forward perspective view of the seat assembly with the panel in the deployed position.
Figure 4B:
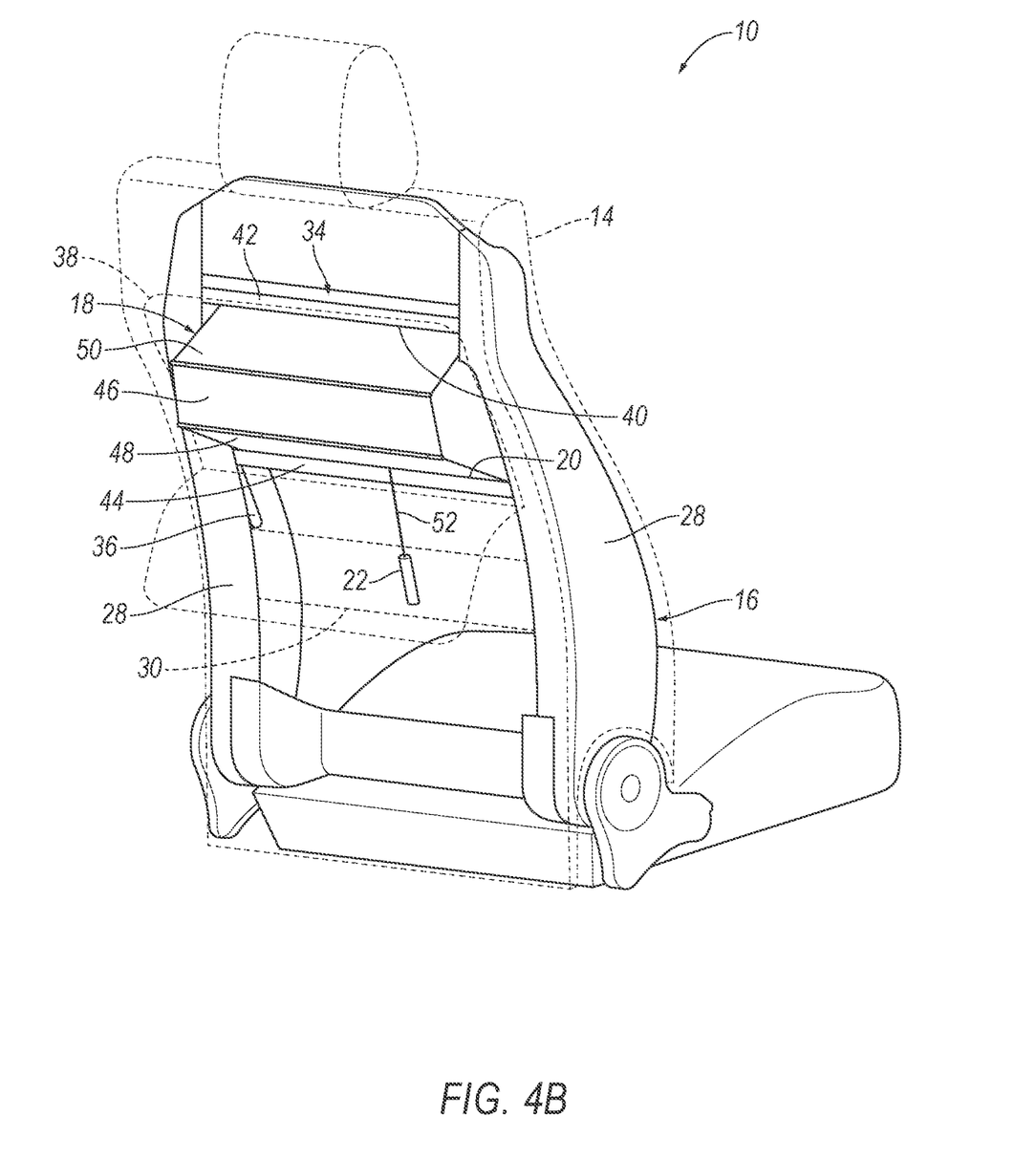
FIG. 4B is a rearward perspective view of the seat assembly with the panel in the deployed position.

The dash 24 may, for example, be flat in the cross-vehicle direction, as shown in FIGS. 1 and 2. In other words, the dash 24 may be generally planar. Specifically, the vehicle-rearward face may be flat.

With reference to FIGS. 1-4B, the vehicle 12 may include one or more seat assemblies 10. Specifically, the vehicle 12 may include any suitable number of seat assemblies 10. As shown in FIG. 1, the seat assemblies 10 are supported by the vehicle floor (not numbered). The seat assemblies 10 may be arranged in any suitable arrangement in the passenger compartment. As in the example shown in the Figures, one or more of the seat assemblies 10 may be at the front end of the passenger compartment, e.g., a driver seat assembly 10 and/or a passenger seat assembly 10. In other examples, one or more of the seat assemblies 10 may be behind the front end of the passenger compartment, e.g., at the rear end of the passenger compartment. The seat assemblies 10 may be movable relative to the vehicle floor to various positions, e.g., movable fore-and-aft and/or cross-vehicle. The seat assembly 10 may be of any suitable type, e.g., a bucket seat.

The seat assemblies 10 includes the seatback 14 and a seat bottom (not numbered). The seatback 14 may be supported by the seat bottom and may be stationary or movable relative to the seat bottom. The seatback 14 and the seat bottom may be adjustable in multiple degrees of freedom. Specifically, the seatback 14 and the seat bottom may themselves be adjustable. In other words, adjustable components within the seatback 14 and/or the seat bottom, and/or may be adjustable relative to each other.

With reference to FIGS. 3A-4B, the seatback 14 includes the seat frame 16 and a covering 26 supported on the seat frame 16. The seat frame 16 may include tubes, beams, etc. Specifically, the seat frame 16 includes a pair of upright frame members 28. The upright frame members 28 are elongated, and specifically, are elongated in a generally upright direction when the seatback 14 is in a generally upright position. The upright frame members 28 are spaced from each other and the seat frame 16 includes one or move cross-members 30 extending between the upright frame members 28. The seat frame 16, including the upright frame members 28, may be of any suitable plastic material, e.g., carbon fiber reinforced plastic (CFRP), glass fiber-reinforced semi-finished thermoplastic composite (organosheet), etc. As another example, some or all components of the seat frame 16 may be formed of a suitable metal, e.g., steel, aluminum, etc.

The covering 26 may include upholstery, padding, and/or plastic portions. The upholstery may be cloth, leather, faux leather, or any other suitable material. The upholstery may be stitched in panels around the seat frame 16. The padding may be between the covering 26 and the seat frame 16 and may be foam or any other suitable material.

With reference to FIG. 2, each seat assembly 10 may rotate about a vertical axis (not numbered) that extends through the vehicle roof and the vehicle floor. For example, the seat assemblies 10 may rotate between a forward-facing position and a rearward-facing position. In the forward-facing position, an occupant of the seat assembly 10 faces the front end of the passenger compartment. In the rearward-facing position, an occupant of the seat assembly 10 faces the rear end of the passenger compartment. The seat assemblies 10 may rotate completely, i.e., 360°, about the vertical axis. The seat assemblies 10 may rotate between fixed positions, e.g., the forward-facing position and the rearward-facing position, or may be rotatable to an infinite number of positions.

The seatback 14 defines an occupant seating area 32 of the seat. The occupant seating area 32 is the area occupied by an occupant when seated on the seat bottom. The occupant seating area 32 is in a seat-forward direction of the seatback 14 and above the seat bottom. In the example shown in the Figures, the occupant seating area 32 faces the front end of the passenger compartment when the seat assembly 10 is in the forward-facing position and the occupant seating area 32 faces the rear end of the passenger compartment when the seat assembly 10 is in the rearward-facing position.

With reference to FIGS. 2-4B, the vehicle 12 includes a panel assembly 34. The panel assembly 34 includes the panel 18, the actuator 22 and at least one track 36. The panel assembly 34 may be supported by the seat. Specifically, the panel assembly 34 may be supported by the seatback 14.

With reference to FIG. 1, one or more of the seat assemblies 10 in the vehicle 12 include the panel assembly 34. As shown in the Figures, the seat assemblies 10 adjacent the one or more dashes 24 in the vehicle 12 may include the panel assembly 34. In other words, both seat assemblies 10 shown in FIG. 1 include a panel assembly 34 because each seat assembly 10 is adjacent the dash 24 at the front end of the passenger compartment. In the event of an impact to the vehicle 12 and where the seat assembly 10 is in the rearward-facing position, the panel 18 of the panel assembly 34 may move to the deployed position to support the seatback 14 against the dash 24 nearest the seat assembly 10, i.e., either the dash 24 at the front end of the passenger compartment or the dash 24 as the rear end of the passenger compartment.

The panel 18 is supported by the seatback 14. Specifically, the panel 18 is supported by the seat frame 16 of the seatback 14. In other words, the seatback 14 is between the panel 18 and the occupant seating area 32. As shown in the example in the Figures, the panel 18 may be concealed by the covering 26 of the seat assembly 10. In such an example, the covering 26 may include a tear seam 38. When the panel 18 moves to the deployed position, the tear seam 38 may be disengaged to allow the panel 18 to move to the deployed position. As an example, the tear seam 38 may extend along a periphery of the panel 18, i.e., may outline the panel 18. In another example, the seatback 14 may include a cover (not shown) to conceal the panel 18 inside the seatback 14. The cover may open in the event of an impact to the vehicle 12 to allow the panel 18 to move to the deployed position. In yet another example, the panel 18 include a class-A surface, i.e., a surface specifically manufactured to have a high quality, finished aesthetic appearance free from blemishes. In such an example, the class-A surface of the panel 18 faces outwardly and may be aligned with the covering 26. The class-A surface may have the same appearance, e.g., color, texture, etc., as the covering 26 and may be connected to the covering 26 at a tear seam 38 that allows the panel 18 to break free of the covering 26 to move to the deployed position.

The panel 18 is movable from an undeployed position to the deployed position in the event of an impact to the vehicle 12 and when the seat assembly 10 is in the rearward-facing position. The panel 18 remains in the undeployed position in the event of an impact to the vehicle 12 and when the seat assembly 10 is in the forward-facing position. In other words, the panel 18 only moves to the deployed position when the seat assembly 10 is in the rearward-facing position.

With reference to FIGS. 3A-4B, the panel 18 is bowable between the undeployed and the deployed position. In the undeployed position, as shown in the Figures, the panel 18 may be concealed under the covering 26 of the seatback 14. As the panel 18 moves to the deployed position, the panel 18 is bowable outwardly from the seatback 14 and toward the dash 24 to the deployed position, i.e., the panel 18 curves outwardly from the seatback 14 in the deployed position. Specifically, the panel 18 is bowable outwardly from the seat frame 16. When bowed outwardly, the end 20 and a second end 40 of the panel 18 remain engaged with the seatback 14, e.g., at the seat frame 16, and a portion of the panel 18 between the end 20 and the second end 40 moves outwardly from the seatback 14. Specifically, the panel 18 bows when the end 20 of the panel 18 slides relative to the seatback 14, as described further below.

The panel 18, as an example, bows to the deployed position in the event of an impact to the vehicle 12 and when the seat assembly 10 is in the rearward-facing position. The panel 18 may abut the dash 24 when the panel 18 is in the deployed position and the seat assembly 10 is in the rearward-facing position. Specifically, the panel 18 is designed to abut the dash 24 when the seat is in the rearward-facing position and the panel 18 is in the deployed position. In other words, the panel 18 may contact the dash 24 when the panel 18 is in the deployed position and the seat assembly 10 is in the rearward-facing position. The panel 18 may support the seatback 14 of the seat assembly 10 against the dash 24 in the event of an impact to the vehicle 12. The panel 18 may contact the dash 24 and limit the rotation of the seatback 14 toward the dash 24 in the event of an impact to the vehicle 12. The panel 18 may absorb energy during the impact by increasing the contact area between the dash 24 and the seatback 14.

The end 20 of the panel 18 is slideably supported by the seat frame 16. Specifically, the end 20 of the panel 18 slides relative to the seat frame 16 as the panel 18 bows to the deployed position. As the panel 18 moves to the deployed position, the end 20 of the panel 18 slides upwardly along the seat frame 16.

As discussed above, the panel assembly 34 includes at least one track 36. The end 20 of the panel is slidably engaged with the track. In other words, the end 20 of the panel 18 slides along the track 36 as the panel 18 moves toward the deployed position. In such an example, the seat assembly 10 may include a pair of tracks 36 spaced from one another. The tracks 36 may be supported by the seat frame 16, i.e., one track 36 on either side of the seat frame 16. Specifically, the tracks 36 may be supported by the upright frame members 28 of the seat frame 16. In such an example, one track 36 may be supported by one of the upright frame members 28 of the seat frame 16 and the other of the tracks 36 may be supported by the other of the upright frame members 28. Alternatively, the end 20 may be slidable relative to the seatback 14 in any suitable way. In the example shown in the Figures, the end 20 is below the second end 40 and the end 20 slides upwardly from the undeployed position to the deployed position. As another example, the end 20 may be above the second end 40 and the end 20 slides downwardly from undeployed position to the deployed position.

The second end 40 of the panel 18 is spaced from the end 20. As shown in the example in the Figures, the second end 40 may be spaced upwardly along the seatback 14, e.g., seat frame 16, from the end 20. The second end 40 may be fixed to the seatback 14 along the seatback 14, e.g., fixed to the seat frame 16. In other words, the second end 40 of the panel 18 does not slide, i.e., does not move along the seat frame 16, as the panel 18 moves to the deployed position. As the panel 18 moves to the deployed position, the end 20 moves toward the second end 40 until the panel 18 reaches the deployed position and is bowed outwardly from the seat frame 16. The panel 18 may rotate about the second end 40 to allow the panel 18 to bow outwardly from the seatback 14. As the end 20 slides along the seatback 14, the panel 18 rotates about the second end 40 to bow outwardly from the seat frame 16. As an example, the panel 18 may bend at the second end 40 and/or may include a pivotable hinge at the second end 40 connecting the second end 40 to the seatback 14.

The panel 18 may include a first rod 42 and a second rod 44 supported by the seat frame 16. The first rod 42 and the second rod 44 may extend from one upright frame member 28 of the seat to the other upright frame member 28. The first rod 42 and the second rod 44 are spaced from each other in both the deployed position and the undeployed position. Specifically, in the example shown in the Figures, the first rod 42 is spaced upwardly from the second rod 44 along the seat frame 16. The first rod 42 may be at the second end 40 of the panel 18, i.e., fixed to the seat frame 16. The second rod 44 may be at the end 20 of the panel 18, i.e., slidable relative to the seat frame 16.

With continued reference to FIGS. 3A-4B, the second rod 44 may be received by the tracks 36. Specifically, the second rod 44 may be slidably engaged with the tracks 36. The second rod 44 may be slidable relative to the seat frame 16 along the track 36 from the undeployed position to the deployed position. As the panel 18 moves to the deployed position, the second rod 44 moves upwardly along the track 36 toward the first rod 42. The sliding of the second rod 44 in the track 36 allows the panel 18 to bow outwardly from the seatback 14 toward the dash 24 and the deployed position.

The panel 18 may include a plurality of segments, e.g., two or more, hinged to each other to allow the panel 18 to bow as the panel 18 moves from the undeployed position to the deployed position. In the example shown in the Figures, the panel 18 includes three segments, specifically, a first segment 46, a second segment 48, and a third segment 50. As another example, in the alternative to multiple segments hinged to each other, the panel 18 may be one-piece from the end 20 to the second end 40 and may bend as the panel 18 moves from the undeployed position to the deployed position.

With reference to the example shown in the Figures, the panel 18 may be bowable at the point where the first segment 46 and the second segment 48 are hinged to one another. In such an example, the first segment 46 may include the second end 40. In other words, the first segment 46 may be fixed relative to the seatback 14. Specifically, the first segment 46 may be attached to the first rod 42. As the end 20 of the panel 18 slides along the seat frame 16, the first segment 46 and the second segment 48 hinge relative to each other and bow outwardly toward the dash 24. The second segment 48 may be slidably supported by the seatback 14. For example, the second segment 48 may include the end 20 slidably supported by the seatback 14. Specifically, the second segment 48 may be attached to the second rod 44. The second segment 48 may slide along the seat frame 16, e.g., the track 36, as the panel 18 moves from the undeployed position to the deployed position. The second segment 48 may slide upwardly along the seat frame 16. The second segment 48 may be received by the track 36 and may be slidable relative to the seat frame 16 along the track 36. As the end 20 slides relative to the seatback 14, the second segment 48 slides along the track 36 to the deployed position. The second segment 48 hinges relative to the first segment 46 to bow the panel 18 toward the dash 24.

In the example shown in the Figures, the panel 18 may include the third segment 50 hinged to the first segment 46. As an example, the first segment 46 may be between the second segment 48 and the third segment 50. In other words, the first segment 46 is hinged to both the second segment 48 and the third segment 50. The third segment 50 may be fixed to the seatback 14. For example, the third segment 50 may include the second end 40 fixed to the seatback 14. Specifically, the third segment 50 may be attached to the first rod 42. The third segment 50 may pivot about the first rod 42 as the panel 18 moves to the deployed position. In the event of an impact to the vehicle 12, the panel 18 hinges between the first segment 46 and the third segment 50 and between the first segment 46 and the second segment 48 to bow outwardly from the seat frame 16 to the deployed position.

The actuator 22 is supported by the seatback 14. For example, the actuator 22 may be mounted to the seat frame 16 at any suitable point, e.g., the actuator 22 may be mounted to the cross-members 30 of the seat frame 16, as shown in the Figures. In other examples, the actuator 22 may be supported by other components of the seat frame 16, e.g., the upright frame members 28 of the seat frame 16.

The actuator 22 is connected to the end 20 of the panel 18 to move the panel 18 from the undeployed position to the deployed position. When the actuator 22 is activated, the actuator 22 moves the end 20 of the panel 18 toward the second end 40 of the panel 18 to move the panel 18 to the deployed position. For example, the seat assembly 10 may include a cable 52 extending from the actuator 22 to the end 20 of the panel 18. Specifically, the seat assembly 10 may include a cable 52 extending from the actuator 22 to the first rod 42 at the second end 40 of the panel 18 and from the first rod 42 to the second rod 44 at the end 20 of the panel 18. The cable 52 may be connected to the ends, i.e., rods 42, 44, in any suitable manner. For example, as shown in the Figures, the ends 20, 40 may include loops (not numbered) that engage with the cable 52 to slide the end 20 of the panel 18 to the deployed position. In the event of an impact to the vehicle 12 and when the seat assembly 10 is in the rearward-facing position, the cable 52 may be retracted by the actuator 22. As the cable 52 is retracted, the actuator 22 pulls the end 20 of the panel 18 along the track 36 to the deployed position. When the actuator 22 is activated, the actuator 22 retracts the cable 52 to move the end 20 toward the deployed position. In other examples, e.g., examples that do not include a cable, the actuator 22 may be connected to the end 20 in any suitable way to move the end 20 toward the deployed position.

The actuator 22 may be a pyrotechnic actuator. In such an example the actuator 22 includes a pyrotechnic charge that activates the actuator 22 to move the panel 18 to the deployed position. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The actuator 22 may be any suitable type such as a rotary actuator, in which the pyrotechnic charge rotates a shaft connected to the cable 52 such that the cable 52 wraps around the shaft; a piston linkage, in which the pyrotechnic charge for example, drives a piston attached to the cable 52; a ball-in-tube linkage, in which an pyrotechnic charge propels a ball or balls over a cogwheel connected to the cable 52; a mechanical linkage, in which a compressed spring attached to the cable 52 is released; or any other suitable type.

The actuator 22 may include a lock 54 that maintains the panel 18 in the deployed position. As the panel 18 moves to the deployed position, the lock 54 engages and the panel 18 is maintained in the deployed position. Maintaining the panel 18 in the deployed position allows the panel 18 to provide support, i.e., a reaction surface, for the seatback 14 against the dash 24 in the event of an impact to the vehicle 12.

The vehicle 12 includes a computer 56 that includes a processor and a memory storing instructions executable by the processor. The memory includes one or more forms of computer readable media, and stores instructions executable by the computer 56 for performing various operations, including as disclosed herein. The computer 56 may include programming to operate one or more of vehicle brakes, propulsion (e.g., control of acceleration in the vehicle 12 by controlling one or more of an internal combustion engine, electric motor, hybrid engine, etc.), steering, climate control, interior and/or exterior lights, etc., as well as to determine whether and when the computer 56, as opposed to a human operator, is to control such operations. Additionally, the computer 56 may be programmed to determine whether and when a human operator is to control such operations.

Figure 5:
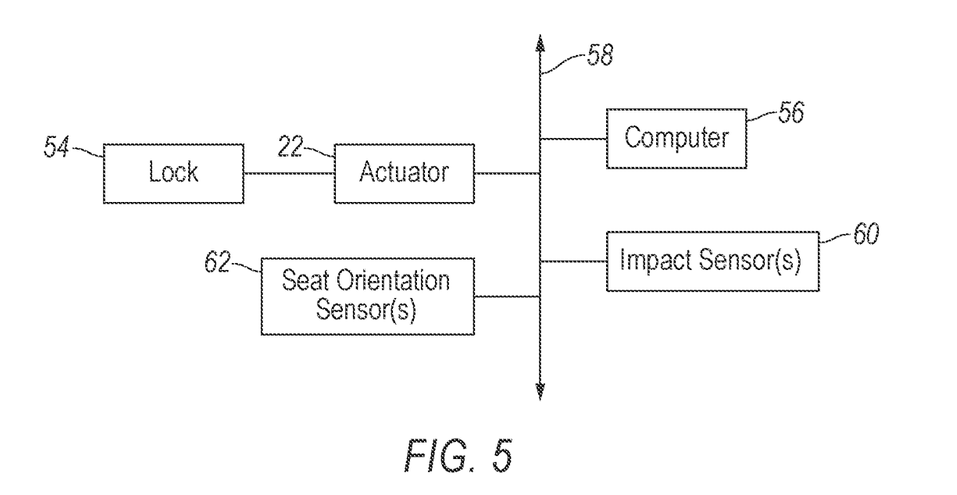
FIG. 5 is a block diagram showing a communication network of the vehicle.

As shown in FIG. 5, the computer 56 may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle components, e.g., a powertrain controller, a brake controller, a steering controller, etc.

The computer 56 is generally arranged for communications on a vehicle communication network 58 that may include a bus in the vehicle 12 such as a controller area network (CAN) or the like, and/or other wired and/or wireless mechanisms. Via the vehicle network, the computer 56 may transmit messages to various devices in the vehicle 12 and/or receive messages (e.g., CAN messages) from the various devices, e.g., sensors, a human machine interface (HMI), etc. Alternatively or additionally, in cases where the computer 56 actually comprises a plurality of devices, the vehicle communication network 58 may be used for communications between devices represented as the computer 56 in this disclosure. Further, as mentioned below, various controllers and/or sensors may provide data to the computer 56 via the communication network 58.

The vehicle 12 may include at least one impact sensor 60 for sensing impact of the vehicle 12, and the computer 56 may be in communication with the impact sensors 60. The impact sensor 60 is configured to detect an impact to the vehicle 12. The impact sensor 60 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 60 may be located at numerous points in or on the vehicle 12.

The vehicle 12 may include seat orientation sensors 62 to identify the orientation of the seat assembly 10 and/or seat assemblies 10, i.e., the seat orientation sensors 62 may identify whether the seat assemblies 10 are in the forward-facing position or the rearward-facing position. The seat orientation sensors 62 may be in communication with the computer 56. The seat orientation sensors 62 may send a signal to the computer 56 to identify whether the seat assembly 10 is in the forward-facing position or the rearward-facing position. The vehicle 12 may include any suitable number of seat orientation sensors 62 to identify the orientation of multiple seat assemblies 10 in the vehicle 12. In other words, the vehicle 12 may include a number of seat orientation sensors 62 equal to the number of seat assemblies 10 that are rotatable in the vehicle 12. In the example shown in the Figures, the vehicle 12 includes two seat orientation sensors 62, i.e., one for each seat that rotates in the vehicle 12.

Figure 6:
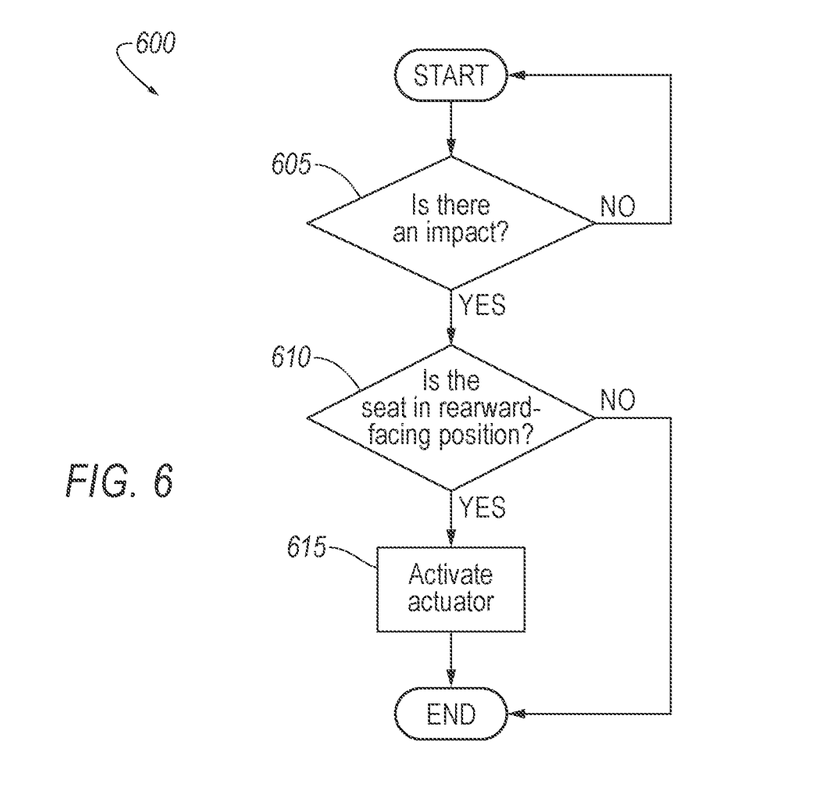
FIG. 6 is a flowchart showing instructions executable by a computer of the vehicle.

With reference to FIG. 6, the computer 56 stores instructions to control components of the vehicle 12 according to an example method 600 shown in FIG. 6. Specifically, as shown in FIG. 6, the computer 56 determines whether one or more of the seat assemblies 10 are in the rearward-facing position. The computer 56 may perform the method 600 for each of the seat assemblies 10 in the vehicle 12 to individually control components of the vehicle 12. "In response to" and "based on" are used throughout this text to indicate a causal relationship, not merely a temporal relationship. For example, the computer 56 controls components of the vehicle 12 as a direct result of determining whether one or more of the seat assemblies 10 is in the rearward-facing position.

With reference to decision block 605, the method includes determining whether there is an impact to the vehicle 12. The impact sensors 60 may identify whether there has been an impact to the vehicle 12 by sending a signal to the computer 56 to indicate the impact. If there is no impact to the vehicle 12, the method begins again at the start.

With reference to decision block 610, the seat orientation sensors 62 may send a signal to the computer 56 identifying the orientation of one or more of the seat assemblies 10. If the seat assembly 10 is determined to be in the forward-facing position, the method ends, i.e., the panel 18 remains in the undeployed position.

With reference to block 615, if the seat assembly 10 is identified as being in the rearward-facing position, the panel 18 moves to the deployed position based on the identification that the seat is in the rearward-facing position. The actuator 22 is activated to move the panel 18 to the deployed position. The lock 54 engages to maintain the panel 18 in the deployed position. The panel 18 provides support for the seatback 14 of the seat assembly 10 in the event of an impact to the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a dash;
a seat having a seatback;
a panel having an end slidably supported by the seatback and a second end spaced from the end, the second end being fixed to the seatback;
the panel being bowable outwardly from the seatback and toward the dash to a deployed position;
the end being slidable relative to the seatback toward the second end as the panel bows toward the deployed position; and
an actuator supported by the seatback and connected to the end of the panel.

2. The vehicle of claim 1, wherein the panel is designed to abut the dash when the panel is in the deployed position.

3. The vehicle of claim 1, wherein the panel includes a first segment and a second segment hinged to the first segment, the second segment including the end slidably supported by the seatback.

4. The vehicle of claim 3, wherein the panel includes a third segment hinged to the first segment, the third segment including a second end fixed to the seatback.

5. The vehicle of claim 1, wherein the seatback includes a track, the end of the panel being slidably engaged with the track.

6. The vehicle of claim 1, wherein the actuator includes a lock maintaining the panel in the deployed position.

7. The vehicle of claim 1, wherein the seat is movable from a forward-facing position to a rearward-facing position, the seatback defining an occupant seating area of the seat and the panel being between the dash and the occupant seating area when the seat is in the rearward-facing position.

8. The vehicle of claim 1, wherein the seat is movable from a forward-facing position to a rearward-facing position, the panel being designed to abut the dash when the seat is in the rearward-facing position and the panel is in the deployed position.

9. The vehicle of claim 1, further comprising a computer including a processor and a memory storing instructions executable by the processor, wherein the instructions include identifying that the seat is in a rearward-facing position and moving the panel to the deployed position based on identification that the seat is in the rearward-facing position.

10. A seat assembly comprising:
a seatback including a seat frame;
a panel having an end slidably supported by the seat frame, the panel being bowable outwardly from the seat frame to a deployed position; and
an actuator supported by the seat frame and connected to the end of the panel;
the panel including a first segment and a second segment hinged to the first segment;
the second segment including the end slidably supported by the seatback.

11. The seat assembly of claim 10, wherein the panel includes a third segment hinged to the first segment, the third segment including a second end fixed to the seat frame.

12. The seat assembly of claim 10, wherein the seatback includes a track, the end of the panel being slidably engaged with the track.

13. The seat assembly of claim 10, wherein the actuator includes a lock maintaining the panel in the deployed position.

14. The seat assembly of claim 10, wherein the panel includes a first rod fixed to the seat frame and a second rod at the end, the second rod being slideably supported by the seat frame.

15. The seat assembly of claim 14, further comprising a cable extending from the actuator to the first rod and from the first rod to the second rod.

16. The seat assembly of claim 10, further comprising a cable extending from the actuator to the end of the panel.

17. The seat assembly of claim 10, wherein the seatback defines an occupant seating area, the seatback being between the panel and the occupant seating area.

18. The seat assembly of claim 10, wherein the panel is designed to abut a dash of a vehicle when the panel is in the deployed position.

19. A vehicle comprising:
a dash;
a seat having a seatback;
a panel having an end slidably supported by the seatback, the panel being bowable outwardly from the seatback and toward the dash to a deployed position;
an actuator supported by the seatback and connected to the end of the panel; and
the actuator including a lock maintaining the panel in the deployed position.

* * * * *